US008365882B2

(12) United States Patent
Kirschner et al.

(10) Patent No.: US 8,365,882 B2
(45) Date of Patent: Feb. 5, 2013

(54) SPRING FOR A COMPOSITE BRAKE DISK AND COMPOSITE BRAKE DISK

(75) Inventors: Thomas Kirschner, Stuttgart (DE); Alexander Prahst, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 584 days.

(21) Appl. No.: 11/953,091

(22) Filed: Dec. 10, 2007

(65) Prior Publication Data

US 2008/0135351 A1 Jun. 12, 2008

(30) Foreign Application Priority Data

Dec. 9, 2006 (DE) .................. 10 2006 058 174

(51) Int. Cl.
*F16F 1/20* (2006.01)

(52) U.S. Cl. .................. 188/218 XL; 267/158; 267/164

(58) Field of Classification Search ............ 188/218 XL, 188/18 A; 464/101, 169; 192/200; 267/158, 267/160, 164, 131–133, 165; 411/176, 544, 411/970

See application file for complete search history.

(56) References Cited

U.S. PATENT DOCUMENTS

| 510,245 | A | * | 12/1893 | Dorr | 411/176 |
| 2,084,926 | A | * | 6/1937 | Tinnerman | 403/21 |
| 2,366,114 | A | * | 12/1944 | Kost | 72/326 |
| 2,546,395 | A | * | 3/1951 | Hubbard | 29/876 |
| 3,754,624 | A | | 8/1973 | Eldred | |
| 3,994,378 | A | | 11/1976 | Schwabe et al. | |
| 5,520,269 | A | * | 5/1996 | Yamamoto et al. | 188/218 XL |
| 6,564,913 | B2 | | 5/2003 | Baumgartner et al. | |
| 6,843,350 | B2 | * | 1/2005 | Larkin et al. | 188/218 XL |
| 2003/0006104 | A1 | | 1/2003 | Baumgartner et al. | |
| 2004/0084262 | A1 | * | 5/2004 | Baylis et al. | 188/218 XL |
| 2004/0182660 | A1 | | 9/2004 | Cavagna et al. | |
| 2005/0269174 | A1 | * | 12/2005 | Lin | 188/218 XL |

FOREIGN PATENT DOCUMENTS

| DE | 31 21 960 A1 | 12/1982 |
| DE | 198 50 180 A1 | 7/1999 |
| DE | 10025102 C1 | 9/2001 |
| DE | 100 46 705 C1 | 7/2002 |

(Continued)

OTHER PUBLICATIONS

European Search Report dated Jan. 22, 2009.
"Mubea Federnhandbuch", Muhr and Bender, Attedorn i.W. F7 10,61, pp. 1-4, publication date unknown.

(Continued)

*Primary Examiner* — Robert A Siconolfi
*Assistant Examiner* — Stephen Bowes
(74) *Attorney, Agent, or Firm* — Leydig, Voit & Mayer, Ltd.

(57) ABSTRACT

A spring for a composite brake disk. The spring has a planar central region with a hole and two spring regions which are formed symmetrically to one another and which in each case on sides lying opposite one another adjoin the planar central region. The spring regions in each case have an arc and a spring arm. Preferably, the spring arms have in each case an end region with a rounded bearing surface. By such a spring being used, a simple construction of a composite brake disk is made possible, the occurrence of hotspots and the effect of thermal rubbing being as far as possible avoided. At the same time, a functionally appropriate fit of the spring is ensured, the load on the pot due to the bearing surface of the spring being kept extremely low.

10 Claims, 3 Drawing Sheets

FOREIGN PATENT DOCUMENTS

| | | |
|---|---|---|
| EP | 1 395 760 B1 | 3/2004 |
| EP | 1395760 B1 | 3/2004 |
| WO | 0225135 A1 | 3/2002 |
| WO | 03/001076 A1 | 1/2003 |

OTHER PUBLICATIONS

Palm et al.: "Berechnung gekrümmter Biegefedern", VDI-Zeitschrift, Edition 101, No. 8, pp. 301-308; Mar. 11, 1959.

* cited by examiner

SPRING FOR A COMPOSITE BRAKE DISK AND COMPOSITE BRAKE DISK

CROSS-REFERENCE TO RELATED APPLICATION

This application claims the priority, under 35 U.S.C. §119, of German application DE 10 2006 058 174.1, filed Dec. 9, 2006; the prior application is herewith incorporated by reference in its entirety.

BACKGROUND OF THE INVENTION

Field of the Invention

The invention relates to a spring for a composite brake disk. The spring has a central region and two spring regions which are formed symmetrically to one another and which in each case on sides lying opposite one another adjoin the planar central region. The invention also relates to a composite brake disk.

European patent EP 1 395 760 B1, corresponding to U.S. patent disclosure No. 2004/0182660 A, describes a composite disk brake disk with a friction ring configured as an annular brake band and with a pot configured as a bell and has a plurality of radial depressions around its circumference. Connection devices are provided between the brake band and the bell. According to European patent EP 1 395 760 B1, disk springs are disposed on the side of the bell in the region of the connection devices, inserts made from wear-resistant material being disposed between the disk springs and that end face of the bell which faces the disk springs.

Known springs which are used in composite brake disks, for example also the disk springs known from European patent EP 1 395 760 B1, may be conducive to the occurrence of hotspots and/or the occurrence of what is known as rubbing.

Rubbing is understood to mean the periodic occurrence of brake force fluctuations in spite of a constant actuating force. Hotspots are heat spots on the friction ring, in particular on the brake disk surface, which may excite the braking and steering system of a motor vehicle into oscillations. Hotspots may occur particularly when a motor vehicle is being braked from high speed.

BRIEF SUMMARY OF THE INVENTION

It is accordingly an object of the invention to provide a spring for a composite brake disk and a composite brake disk which overcomes the above-mentioned disadvantages of the prior art devices of this general type, which makes it possible to have a simple and robust construction of the composite brake disk and the use of which contributes to the avoidance of hotspots and to the avoidance of rubbing of the brake disk.

A spring of the type initially mentioned has, according to the invention, two spring regions which are formed symmetrically to one another and which in each case on sides lying opposite one another adjoin the planar central region, the spring regions having in each case an arc and a spring arm. The spring according to the invention, by virtue of its long free bending length and the formation of the arc, achieves a very flat characteristic curve and is distinguished by a simple and compact form of construction. Overall, the features of the spring according to the invention afford markedly improved properties for use in a composite brake disk, as compared with known springs, the occurrence of hotspots and the effect of thermal rubbing being as far as possible avoided.

Advantageously, the arcs of the spring regions may in each case describe a circle arc to which an angle of at least 180° corresponds.

Advantageously, the arcs may be formed convexly, and a concave transitional region may be provided in each case between the central region and the convex arcs. The characteristic curve of the spring is thereby further improved.

Preferably, the transitional regions may in each case describe a circle arc to which an angle of up to 90° corresponds.

Preferably, the transitional regions may in each case describe a circle arc to which an angle of up to 45° corresponds.

Advantageously, the radius of the transitional regions may amount to at least four times the wall thickness of the spring.

Advantageously, the spring arms may in each case have an end region with a rounded bearing surface. This configuration of the end regions of the spring arms ensures in a structurally simple way that the pot of a composite brake disk is not damaged by the spring which comes to bear.

The object on which the invention is based is also achieved by a composite brake disk with a friction ring, with a pot and with a plurality of connection devices connecting the pot and the friction ring, in each case a spring according to the invention or one of its developments being provided for each connection device, in order to allow an elastic axial play between the pot and the friction ring.

Other features which are considered as characteristic for the invention are set forth in the appended claims.

Although the invention is illustrated and described herein as embodied in a spring for a composite brake disk and a composite brake disk, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
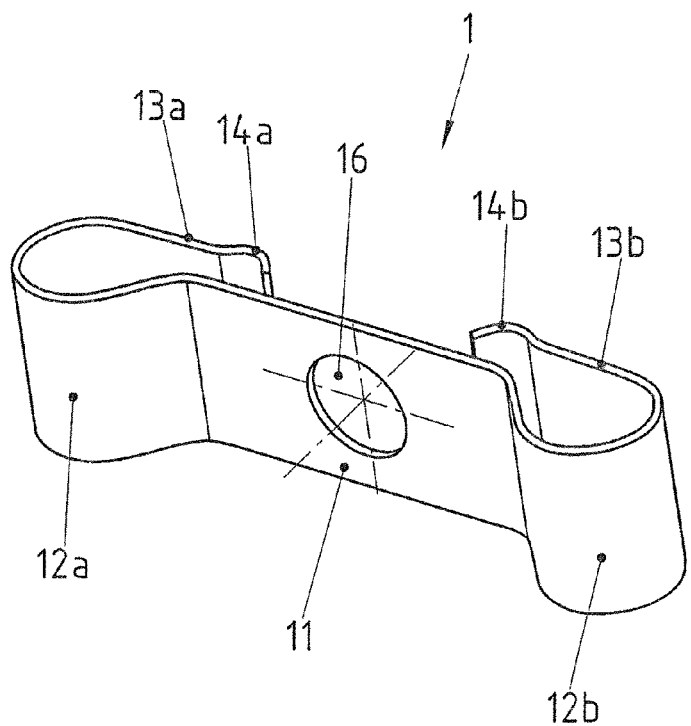
FIG. 1 is a diagrammatic, perspective view of an exemplary embodiment of a spring according to the invention.

Referring now to the figures of the drawing in detail and first, particularly, to FIG. 1 thereof, there is shown a perspective view of a spring 1 for a composite brake disk. The spring 1 has a planar central region 11 with a hole 16. Spring regions adjoin the central region 11 in each case on sides lying opposite one another. The two spring regions are characterized in each case by a generally concavely formed arc 12a, 12b. In the example shown, the arcs 12a, 12b in each case describe generally a circle arc, the angle which corresponds to the circle arc amounting to at least 180°, in the example shown to more than 180°. Spring arms 13a, 13b in each case adjoin the arcs 12a, 12b. The spring arms 13a, 13b have curved end regions 14a, 14b in the example shown. The end regions 14a, 14b of the spring arms 13a, 13b have a rounded bearing surface, with the result that damage to the pot 2 (see FIGS. 2 and 3) of the composite brake disk is reliably avoided even under high stress.

Figure 2:
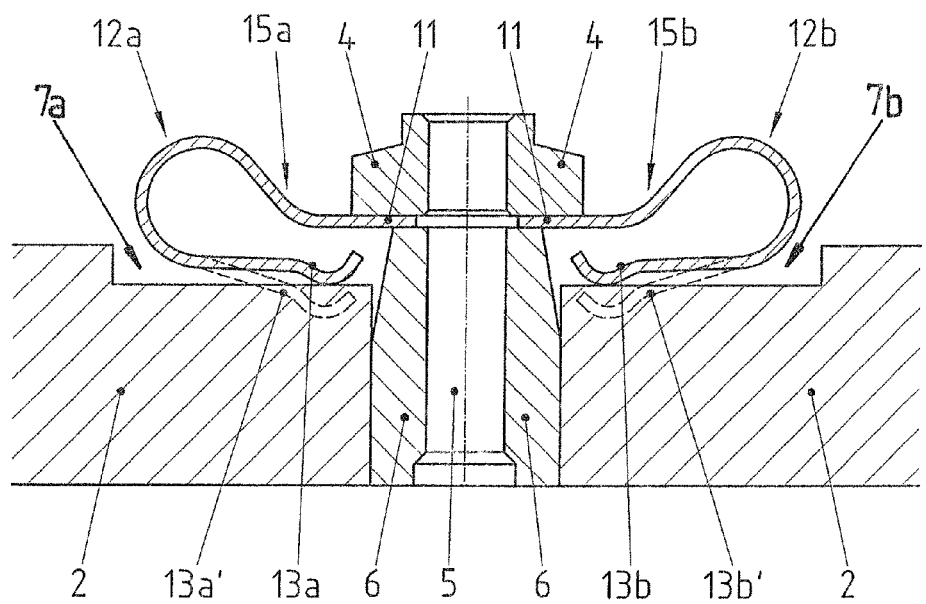
FIG. 2 is a sectional view through the spring according to the invention and part of a composite brake disk.

FIG. 2 shows a section through a spring, such as is illustrated in perspective in FIG. 1, and through part of a composite brake disk. A connection device 5 for the pot 2 and a friction ring 3 (see FIG. 3) of the brake disk extends through a hole in the pot 2 of the brake disk and through the hole 16 (see FIG. 1), not designated in any more detail in FIG. 2, in the central region 11 of the spring. Between the pot 2 and the connection device 5, an intermediate element 6 may be provided which receives the connection device 5. The intermediate element 6 may in this case be of a sleeve-shaped configuration particularly in the region of the pot 2. The spring is preferably disposed with a sliding fit. The central region 11 of the spring may touch one end of the intermediate element 6 or be mounted so as to cooperate with the intermediate element 6. In this case, the intermediate element 6 may be configured as an anti-twist device for the spring. In the example shown, a nut 4 is screwed onto the connection device 5. The nut 4 is preferably of a self-locking configuration.

Transitional regions 15a, 15b are provided in each case between the arcs 12a, 12b and the central region 11 of the spring. The transitional regions 15a, 15b are in each case formed concavely and preferably describe a circle arc, the angle which corresponds to the circle arc of the transitional regions 15a, 15b being markedly smaller than the angle which corresponds to the circle arc of the convex arcs 12a, 12b. In the example shown, the transitional regions in each case describe a circle arc to which an angle of up to 90° corresponds. The radius of the transitional regions 15a, 15b may preferably be approximately equal to or greater than four times a wall thickness of the spring. The spring is preferably produced from a single semi-finished product and is formed, for example, of high-grade steel, in particular of a curved high-grade steel sheet.

FIG. 2 illustrates the spring, tensioned, in its installation position. The spring arms in the tensioned position are identified by reference symbols 13a, 13b. As a comparison, the relaxed position of the spring arms is indicated by dashes in the drawing and is given the reference symbols 13a', 13b'. By virtue of the movability of the spring, thermally induced variations in position between the pot 2 and the friction ring 3 can be reliably compensated. The occurrence of thermally induced rubbing can thus be at least as far as possible avoided.

The rounded bearing surfaces, not given reference symbols in FIG. 2 for the sake of clarity, of the end regions 14a, 14b (see FIG. 1) of the spring arms 13a, 13b prevent damage to the pot 2 of the brake disk. By virtue of such a configuration of the spring arms 13a, 13b, additional pressure disks and/or compensating elements between the spring arms 13a, 13b and the pot 2 may be dispensed with. This is more beneficial in thermal terms and, moreover, leads to a more cost-effective and more robust configuration.

Figure 3:
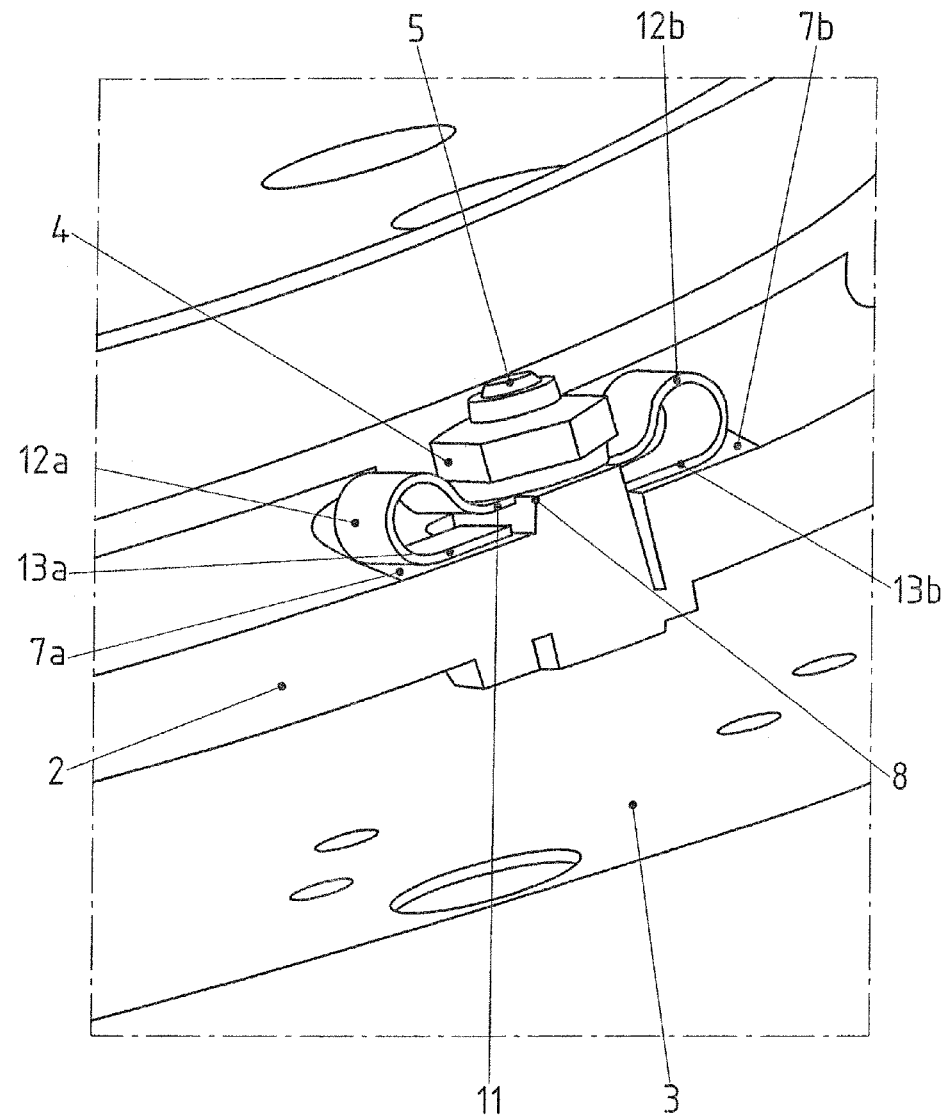
FIG. 3 is diagrammatic, partial perspective view of the composite brake disk.

FIG. 3 shows a spring for a composite brake disk, the composite brake disk having a friction ring 3 and a pot 2. A nut 4 is screwed onto the connection device 5 only the start of which can be seen in FIG. 3, for the pot 2 and for the friction ring 3. The composite brake disk may have, for example, a pot 2 made from metal, for example from high-grade steel or preferably from light metal, for example aluminum or magnesium. The material used for the friction ring 3 may be, for example, a metal or a metal alloy, such as steel, for example gray cast iron, ceramic or carbon. The connection devices 5 may be produced, using a metal alloy, for example high-grade steel.

The spring arms 13a, 13b of the composite brake disk bear on the pot 2 of the brake disk, the spring arms preferably having the end regions 14a, 14b, described in connection with FIGS. 1 and 2, with rounded bearing surfaces which are not illustrated in any more detail in FIG. 3. Preferably, depressions 7a, 7b for receiving the spring arms 13a, 13b are provided in the pot 2. The pot 2 and/or the intermediate element 6, described in connection with FIG. 2, are/is preferably configured in such a way that the spring is held particularly in the radial direction. The pot 2 and/or the intermediate element 6 (see FIG. 2) may in this case form an anti-twist device for the spring. Preferably, for this purpose, webs 8 are formed on the pot 2 or on the intermediate element 6 and, with the spring mounted, are arranged on the two sides of the spring which are not delimited by the spring regions.

By a spring according to the invention being used, a simple construction of a composite brake disk is made possible, the occurrence of hotspots and the effect of thermal rubbing being as far as possible avoided. At the same time, a functionally appropriate fit of the spring is ensured, the load on the pot 2 due to the bearing surface of the spring being kept extremely low. By the spring being configured with a central region 11 and with the spring regions formed symmetrical to one another and having the arcs 12a, 12b and the spring arms 13a, 13b, the characteristic curve of the spring is improved in a functionally appropriate way and, at the same time, a circumferentially self-holding spring is provided, which allows an elastic axial play between the pot 2 and the friction ring 3 of a composite brake disk.

The invention claimed is:

1. A spring for a composite brake disk, the spring comprising:
    a planar central region having a hole formed therein; and
    two symmetrical spring regions extending from opposite sides of the planar central region, each spring region including:
        a convex circle arc extending about an angle of at least 180°, the convex circle arc extending above and below the planar central region in a direction transverse to a plane of the planar central region,
        a concave transitional region connecting the convex circle arc to the planar central region, the concave transitional region having an arc with an angle that is smaller than the angle of the convex circle arc, and
        a spring arm disposed at a free end of the convex circle arc and at a distance to the planar central region, the spring arm including free end region having a rounded bearing surface.

2. The spring according to claim 1, wherein the concave transitional region of each arm forms a circle arc having an angle of up to 90°.

3. The spring according to claim 2, wherein the concave transitional region of each arm forms a circle arc having an angle of up to 45°.

4. The spring according to claim 1, wherein each concave transitional has a radius amounting to at least four times a wall thickness of the spring.

5. A composite brake disk, comprising:
    a friction ring;
    a pot;
    a plurality of connection devices connecting said pot to said friction ring;
    a plurality of springs, one of said springs provided for each of said connection devices for allowing an elastic axial play between said pot and said friction ring, each of said springs containing:
        a planar central region having a hole formed therein; and two symmetrical spring regions extending from opposite sides of the planar central region, each spring region including:
- a convex circle arc extending about an angle of at least 180°, the convex circle arc extending above and below the planar central region in a direction transverse to a plane of the planar central region,
- a concave transitional region connecting the convex circle arc to the planar central region, the concave transitional region having an arc with an angle that is smaller than the angle of the convex circle arc, and
- a spring arm disposed at a free end of the convex circle arc at a distance to the planar central region and resting in a spring-mounted manner directly on said pot; and a plurality of intermediate elements, each intermediate element corresponding to a respective one of said springs and being configured as an anti-twist device for the corresponding spring.

6. The composite brake disk according to claim 5, further comprising webs and at least part of said planar central region being held in an anti-twist manner by said webs.

7. The composite brake disk according to claim 5, wherein said of has depressions formed therein for receiving said spring arms.

8. The composite brake disk according to claim 5, wherein:
said pot has holes formed therein; and
said connection devices extend through said holes of said pot.

9. The composite brake disk according to claim 5, wherein each connection device is disposed with a sliding fit.

10. The composite brake disk according to claim 5, wherein each connection device extends through the hole of a respective one of the springs.

* * * * *